United States Patent
Chen et al.

(10) Patent No.: US 9,422,167 B2
(45) Date of Patent: Aug. 23, 2016

(54) METHOD FOR FORMING BASIC NICKEL CARBONATE

(71) Applicant: CHUNG-YUAN CHRISTIAN UNIVERSITY, Tao-Yuan (TW)

(72) Inventors: Chih-Chi Chen, Taoyuan (TW); Li-Peng Li, Taoyuan (TW)

(73) Assignee: CHUNG-YUAN CHRISTIAN UNIVERSITY, Tao-Yuan (TW)

( * ) Notice: Subject to any disclaimer, the term of this patent is extended or adjusted under 35 U.S.C. 154(b) by 0 days.

(21) Appl. No.: 14/583,362

(22) Filed: Dec. 26, 2014

(65) Prior Publication Data
US 2016/0090311 A1    Mar. 31, 2016

(30) Foreign Application Priority Data
Sep. 26, 2014   (TW) .............................. 103133541 A

(51) Int. Cl.
*C01G 53/06* (2006.01)
*B01J 19/00* (2006.01)
*C01G 53/04* (2006.01)

(52) U.S. Cl.
CPC ................ *C01G 53/06* (2013.01); *C01G 53/04* (2013.01); *C01P 2002/72* (2013.01); *C01P 2004/03* (2013.01)

(58) Field of Classification Search
CPC .................................. B01J 19/00; C01G 53/06
USPC ........................................................ 423/419.1
See application file for complete search history.

(56) References Cited

U.S. PATENT DOCUMENTS 2,092,525 A * 9/1937 Adkins ................. C07C 209/72
                                                                 502/259
3,630,892 A * 12/1971 Hirs et al. ................. C02F 9/00
                                                                 210/673

OTHER PUBLICATIONS

Definition of module, accessed online at http://dictionary.reference.com/browse/module?s=t on Jan. 7, 2016.*

* cited by examiner

*Primary Examiner* — Daniel C McCracken
(74) *Attorney, Agent, or Firm* — WPAT, PC; Justin King

(57) ABSTRACT

The present disclosure provides a novel method to fabricate the basic nickel carbonate particulates. The nickel content in the basic nickel carbonate particulates fabricated by this invention (51-53 mass %) is higher than the present commercialized products (44-46 mass %). Basic nickel carbonate is an important intermediate to prepare NiO and pure Ni particles, and NiO and pure Ni particles are important materials in electronic industrial. Therefore, basic nickel carbonate has its potential market.

8 Claims, 4 Drawing Sheets

METHOD FOR FORMING BASIC NICKEL CARBONATE

BACKGROUND OF THE INVENTION

1. Field of the Invention

The present invention is generally related to a method for forming basic nickel carbonate, and more particularly to a method for forming basic nickel carbonate using sodium carbonate and sodium bicarbonate.

2. Description of the Prior Art

Nickel is very important material in the electronic industry and the livelihood, especially plating nickel demand is quite large and the process is quite common, and its demand is all over the integrated circuit and printed circuit board industries. In particular, for the nickel plating process commonly used as additives for adjusting the pH value of the plating solution and adding the nickel content.

Basic nickel carbonate is an important inorganic fine chemicals, it is mainly for the preparation of a variety of nickel salt. It is widely used in electroplating, electroforming, enamel paint and industrial catalysts and other industries. Besides the high quality of basic nickel carbonate can be used in electronics industry.

There are advantages of a simple process for preparation of powder materials by liquid phase reaction to generating precipitation method. It is a widely used method. However, in the current industrial production process, for selecting of the raw material and controlling of process conditions and so on, basic nickel carbonate samples prepared, the impurity is not only high content but also difficult to removal in the washing process. It could not meet the needs of high-purity raw material needs in the industry. To solve the above problem, it is used a solution for nickel raw materials and sodium carbonate as precipitant, to explore a continuous synthesis of high-purity basic nickel carbonate process method. Through the choice of raw materials nickel and the conditions of process control, the powder surface of basic nickel carbonate is smooth, and the powder internal is compact, and the powder package less impurities. After washing, it could obtain a high purity product of basic nickel carbonate.

In addition, nickel carbonate is an important compound of nickel. There are known morphology such as nickel carbonate, basic nickel carbonate and nickel carbonate acid. Usually it is obtained by nickel nitrate and sodium carbonate aqueous solution. The difference of preparation methods is obtained different compound. One composition is written as xNiCO3.yNi (OH) 2. zH2O, it is a pale green amorphous material. Pure nickel carbonate and nickel carbonate acid are less, and the basic nickel carbonate is mainly. The most common composition is written as NiCO3.Ni(OH)2.H2O; NiCO3.2Ni(OH) 2.4H2O.

Basic nickel carbonate is mainly used to three main areas: (1) the inorganic intermediate product, prepared as other nickel salts: nickel acetate, nickel sulfamate, catalysts, other organic nickel salt intermediates prepared; (2) preparation of nickel oxide calcined or further reduced to nickel powder, for magnetic materials and carbide; (3) electroplating materials, ceramic pigments and the like.

Production of basic nickel carbonate is mainly synthesized by aqueous solution that is comprised sodium carbonate in nickel nitrate or nickel sulfuric acid, it was also using ammonium bicarbonate as a replace of sodium carbonate. Some studies use a precipitation of nickel ammonium carbonate, a precipitation of carbonate and a precipitation of high concentrations of urea to prepare basic nickel carbonate.

Nowadays, production plant produced nickel carbonate with high impurity, and nickel content is low. It is difficult to meet the requirements of high-quality nickel. Moreover the production is a long time for hot water washing process, and high energy consumption. It is consumed a large amount of water, 1 ton product is needed 80-100 tons of washing water and a lot of coal. There are first washing, first drying, secondary washing, secondary drying, and grinding in the production of process. By the process, the product of nickel carbonate have lower sodium, lower chloride, and lower sulfate. Another production process, the materials of coarse nickel carbonate is conducted flash drying by spinning flash dryer, it is shown a villous or floc particles, and it is a non-pure nickel carbonate which contents the sodium. Then nickel carbonate is conducted the dried process and then nickel carbonate is added in the slurry washing tank with 60-80° C. pure water. It is conducted washed slurry. By pressure filtration, it is get the carbonate nickel products removed sodium. After washing, sodium which contented in nickel carbonate is dropped about 20%-40% than before washing. It is reduced the content of sodium (Na content of 0.05 to 0.1%). It meets production requirements. There are studies for the above-mentioned problems, a continuous washing equipment with dry process, it could greatly reduce the washing time and hot pure water, while reducing the sodium content (<0.01%). Meanwhile, the reaction materials which comprise nickel sulfate and sodium carbonate are discussed.

Current research related to the preparation technology of the basic nickel carbonate is extremely rare in Taiwan. Production of basic nickel carbonate is also mostly small-scale manufacturers, the main source of the basic nickel carbonate is from mainland China. At present the main synthesis technology use $NiSO_4$ as a source of nickel. $NiSO_4$ with Na2CO3 reacts into basic nickel carbonate. In addition to Na2CO3, some synthesis use ammonium bicarbonate (NH3HCO3). The nickel content of the synthesis of the basic nickel carbonate are less than 50% (mass %).

So, how to produce low-cost basic nickel carbonate, and the production of basic nickel carbonate can improve the problem of dust, avoid agglomeration, keep good liquidity, has the faster rate of dissolution in acid, and increase yield. Current industry demand is still eager to improve on the industry.

SUMMARY OF THE INVENTION

In light of the above background, in order to fulfill the requirements of industries, one object of the present invention is to provide a method for forming basic nickel carbonate. Particularly, the present invention uses sodium carbonate and sodium bicarbonate to prepare basic nickel carbonate. In order to solve the currently problems in the industry, it is important to improve the yield of basic nickel carbonate and upgrade technology.

The present invention is based on $Ni(NO_3)_2$ as the source of nickel, in addition to the general common of $Na_2CO_3$ as a source of carbonate, it also uses $NaHCO_3$. The NaHCO3 is a role except for the supply of carbonate, also as a buffer solution of the reaction process. It reduce the volume expansion during the reaction of the reactants, and promote the conversion rate of the reaction. Basic nickel carbonate is the composite which is $NiCO_3$ with $Ni(OH)_2$. Under acidic conditions, the content of $NiCO_3$ is higher in the product of basic nickel carbonate; conversely, under alkaline conditions, the content of $Ni(OH)_2$ is higher in the product of basic nickel carbonate. By adding sodium bicarbonate (NaHCO3) to adjust the amount of carbonate and control the pH value, in order to vary the content which is NiCO3 and Ni(OH)2 in the synthesis of the basic nickel carbonate. It aims to improve the content of nickel. The unique feed details also affect the nickel content of the product. By introducing the buffer solution of $NaHCO_3$, the feed of the present invention and the prior art is completely different. The present invention includes to premix the solution of $Ni(NO_3)_2$ and the solution of Na2CO3, flow into the buffer solution of the $NaHCO_3$, and control the flow rate of feed and so on.

According to the above objectives, this present invention provides a system for forming basic nickel carbonate. The system for forming basic nickel carbonate comprises a premixing module. The premixing module comprises a first premixing reactant and a second premixing reactant, and the first premixing reactant and the second premixing reactant are mixed in the premixing module to form a seed solution of basic nickel carbonate. The first premixing reactant further comprises a compound of carbonate. The second premixing reactant further comprises a compound of the nickel element. The mentioned system for forming basic nickel carbonate comprises a reaction module. The mentioned reaction module comprises a reactant and a flow field control module. The mentioned reactant further comprises a compound of bicarbonate, such as sodium bicarbonate ($NaHCO_3$). The mentioned flow field control module is used to control the environment of the flow field of said reaction module. The mentioned seed solution of basic nickel carbonate is imported into the reaction module by the premixing module. The mentioned system for forming basic nickel carbonate comprises a first feeding module. The mentioned first feeding module is used to importing a first feeding reactant into the mentioned reaction module. The mentioned first feeding reactant further comprises a compound of bicarbonate. And the mentioned system for forming basic nickel carbonate comprises a second feeding module. The mentioned second feeding module is used to importing a second feeding reactant into the reaction module. The mentioned second feeding reactant further comprises a compound of the nickel element.

Accordingly, in one embodiment, the present invention discloses the mentioned compound of carbonate is sodium carbonate ($Na_2CO_3$). The mentioned compound of the nickel element is nickel nitrate ($Ni(NO_3)_2$). The mentioned compound of bicarbonate is sodium bicarbonate ($NaHCO_3$). The mentioned reactant concentration of the mentioned first premixing reactant is about 0.5 to 2 M (Mole/L). The reactant concentration of the mentioned second premixing reactant is about 0.5 to 1.5 M (Mole/L). The reactant concentration of the mentioned reactant is about 0.5 to 2 M (Mole/L). The reactant concentration of the mentioned first feeding reactant is about 0.5 to 2 M (Mole/L). The reactant concentration of the mentioned second feeding reactant is about 0.5 to 1.5 M (Mole/L). The volume percentage of the mentioned first premixing reactant, the mentioned second premixing reactant, the mentioned first feeding reactant, the mentioned second feeding reactant and the mentioned reactant is about 5:(5~15):(90~100):(90~100):(90~100). The volume percentage of the mentioned first premixing reactant, the mentioned second premixing reactant, the mentioned first feeding reactant, the mentioned second feeding reactant and the mentioned reactant is about 5:5:95:95:100.

Accordingly, in one embodiment, the present invention discloses the feed rate of the mentioned first feeding module and the mentioned second feeding module are 0.4~1.2 mL/min and 0.4~1.2 mL/min. The mentioned reaction module is at 70~90° C. and 7-9 PH value in the environment of the flow field. The system for forming basic nickel carbonate comprises a washing module, a filtering module and a drying module to clean, filter and dry the basic nickel carbonate.

According to the above objectives, this present invention provides a method for forming basic nickel carbonate. The method for forming basic nickel carbonate comprises performing a premixing procedure, to blend a first premixing reactant and a second premixing reactant to form a seed solution of basic nickel carbonate, wherein said first premixing reactant further comprises a compound of carbonate, wherein said second premixing reactant further comprises a compound of the nickel element; performing a feeding procedure, to add said seed solution of basic nickel carbonate once and import said first feeding reactant and said second feeding reactant into a reaction module; wherein said reactant further comprises a compound of bicarbonate, such as sodium bicarbonate ($NaHCO_3$), wherein a flow field control module is used to control the environment of the flow field of said reaction module; and performing a reaction procedure, to blend said seed solution of basic nickel carbonate, said first feeding reactant and said second feeding reactant to form the basic nickel carbonate in said reaction module. The mentioned compound of carbonate is sodium carbonate ($Na_2CO_3$). The mentioned compound of the nickel element is nickel nitrate ($Ni(NO_3)_2$). The mentioned compound of bicarbonate is sodium bicarbonate ($NaHCO_3$).

Accordingly, in one embodiment, the present invention discloses the reactant concentration of the mentioned first premixing reactant is about 0.5 to 2 M (Mole/L). The reactant concentration of the mentioned second premixing reactant is about 0.5 to 1.5 M (Mole/L). The reactant concentration of the mentioned reactant is about 0.5 to 2 M (Mole/L). The reactant concentration of the mentioned first feeding reactant is about 0.5 to 2 M (Mole/L). The reactant concentration of the mentioned second feeding reactant is about 0.5 to 1.5 M (Mole/L). The feed rate of the mentioned first feeding reactant and the mentioned second feeding reactant are 0.4~1.2 mL/min and 0.4~1.2 mL/min. The volume percentage of the mentioned first premixing reactant, the mentioned second premixing reactant, the mentioned first feeding reactant, the mentioned second feeding reactant and the mentioned reactant is about 5:(5~15):(90~100):(90~100):(90~100). The volume percentage of the mentioned first premixing reactant, the mentioned second premixing reactant, the mentioned first feeding reactant, the mentioned second feeding reactant and the mentioned reactant is about 5:5:95:95:100.

Accordingly, in one embodiment, the present invention discloses the mentioned reaction module is at 70~90° C. and 7-9 PH value in the environment of the flow field. The mentioned method for forming basic nickel carbonate comprises a washing procedure, a filtering procedure and a drying procedure to clean, filter and dry the basic nickel carbonate. The reaction equation of the mentioned reaction procedure is as follows:

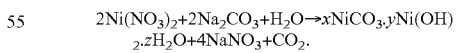

$2Ni(NO_3)_2 + 2Na_2CO_3 + H_2O \rightarrow xNiCO_3.yNi(OH)_2.zH_2O + 4NaNO_3 + CO_2.$

DESCRIPTION OF THE PREFERRED EMBODIMENTS

What is probed into the invention is a method for forming basic nickel carbonate. Detail descriptions of the compositions, structures, elements and steps will be provided in the following in order to make the invention thoroughly understood. Obviously, the application of the invention is not confined to specific details familiar to those who are skilled in the art. On the other hand, the common compositions, structures, elements and steps that are known to everyone are not described in details to avoid unnecessary limits of the invention. Some preferred embodiments of the present invention will now be described in greater detail in the following. However, it should be recognized that the present invention can be practiced in a wide range of other embodiments besides those explicitly described, that is, this invention can also be applied extensively to other embodiments, and the scope of the present invention is expressly not limited except as specified in the accompanying claims.

Figure 1:
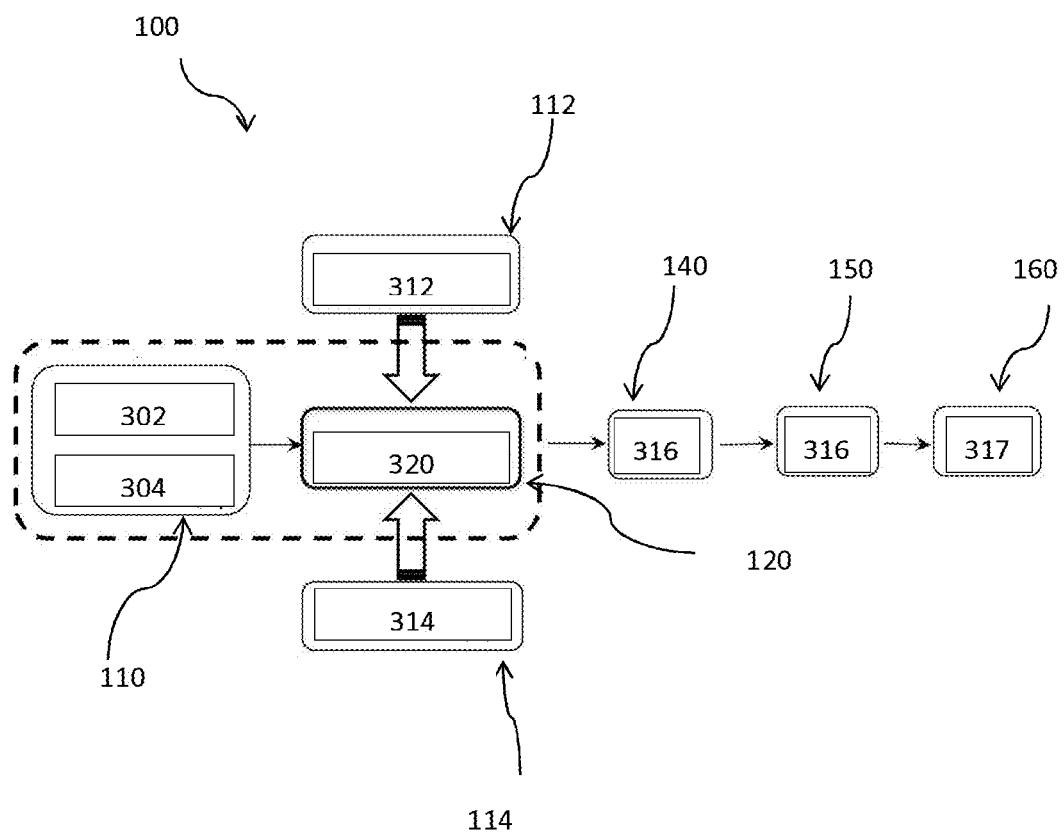
FIG. 1 shows a chart of a system for forming basic nickel carbonate according to one embodiment of the present invention.
Figure 2:
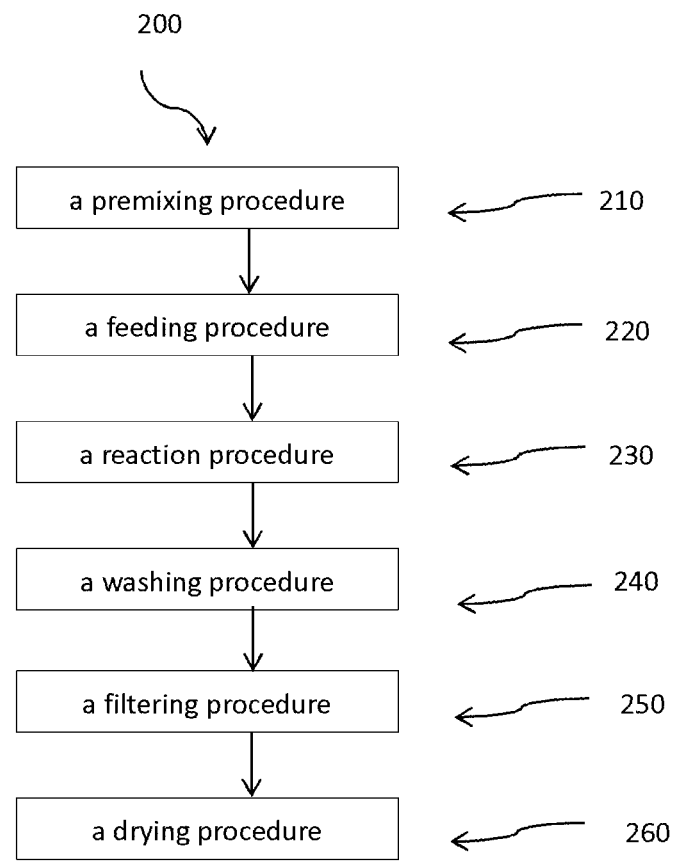
FIG. 2 shows a follow chart of a method for forming basic nickel carbonate according to one embodiment of the present invention.

The one embodiment according to this specification discloses a system for forming basic nickel carbonate 100 to perform a method for forming basic nickel carbonate 200, as shown in FIGS. 1 and 2. First, A premixing module 110 is provided to perform a premixing procedure 210. The premixing module 110 can further comprise a first premixing reactant 302 and a second premixing reactant 304, and the first premixing reactant 302 and the second premixing reactant 304 are mixed in the premixing module 110. The volume percentage of the above the first premixing reactant 302 and the second premixing reactant 304 is about 1:0.5 to 1:3. Preferably, the volume percentage of the above the first premixing reactant 302 and the second premixing reactant 304 is about 1:1. The first premixing reactant 302 further comprises a compound of carbonate, such as sodium carbonate ($Na_2CO_3$). And the second premixing reactant 304 further comprises a compound of the nickel element, such as nickel nitrate ($Ni(NO_3)_2$). The reactant concentration of the above the first premixing reactant 302 is about 0.5 to 2 M (Mole/L). Preferably, the reactant concentration of the above the first premixing reactant 302 is about 1.5 M (Mole/L). And the reactant concentration of the above the second premixing reactant 304 is about 0.5 to 1.5 M (Mole/L). Preferably, the reactant concentration of the above the second premixing reactant 304 is about 1 (Mole/L). Thereby, a seed solution of basic nickel carbonate 315 is formed by the premixing procedure 210.

According to the one embodiment, the system for forming basic nickel carbonate 100 provides a reaction module 120, as shown in FIGS. 1 and 2. The reaction module 120 can further comprise a reactant 320. The reactant 320 further comprises a compound of bicarbonate, such as sodium bicarbonate ($NaHCO_3$). The reactant concentration of the above reactant 320 is about 0.5 to 2 M (Mole/L).

According to the one embodiment, the system for forming basic nickel carbonate 100 provides a first feeding module 112 and a second feeding module 114, as shown in FIGS. 1 and 2. The first feeding module 112 and the second feeding module 114 can further respectively comprise a first feeding reactant 312 and a second feeding reactant 314. The first feeding reactant 312 further comprises a compound of carbonate, such as sodium carbonate ($Na_2CO_3$). And the second feeding reactant 314 further comprises a compound of the nickel element, such as nickel nitrate ($Ni(NO_3)_2$). The volume percentage of the above the first feeding reactant 312 and the second feeding reactant 314 is about 1:0.5 to 1:3. Preferably, the volume percentage of the above the first feeding reactant 312 and the second feeding reactant 314 is about 1:1. The reactant concentration of the above the first feeding reactant 312 is about 0.5 to 2 M (Mole/L). Preferably, the reactant concentration of the above the first feeding reactant 312 is about 1.5 M (Mole/L). And the reactant concentration of the above the second feeding reactant 314 is about 0.5 to 1.5 M (Mole/L). Preferably, the reactant concentration of the above the second feeding reactant 314 is about 1 M (Mole/L).

Furthermore, the volume percentage of the above the first premixing reactant 302, the second premixing reactant 304, the first feeding reactant 312, the second feeding reactant 314 and the reactant 320 is about 5:(5~15):(90~100):(90~100):(90~100). Preferably, the volume percentage of the above the first premixing reactant 302, the second premixing reactant 304, the first feeding reactant 312, the second feeding reactant 314. and the reactant 320 is about 5:5:95:95:100.

According to the one embodiment, the method for forming basic nickel carbonate 200 performs a feeding procedure 220. First, the seed solution of basic nickel carbonate 315 of the premixing module 110 is fed into the reaction module 120. Then, the first feeding module 112 and the second feeding module 114 are simultaneously fed into the reaction module 120 to perform reaction. The feed rate of the above the first feeding module 112 and the second feeding module 114 are 0.4~1.2 mL/min and 0.4~1.2 mL/min. Preferably, the feed rate of the above the first feeding module 112 and the second feeding module 114 are 0.8 mL/min and 0.8 mL/min. And the above the first feeding module 112 and the second feeding module 114 further comprise the combined flow of the feeding.

According to the one embodiment, the method for forming basic nickel carbonate 200 performs a reaction procedure 230. The reaction procedure 230 is stirred for 1 to 3 hours at 70~90° C. and 7-9 PH value. To perform the reaction procedure 230, the reactant 320, the seed solution of basic nickel carbonate 315, the first feeding reactant 312 and the second feeding reactant 314 are reacted to form basic nickel carbonate 316 in the reaction module 120. The reaction equation of the reaction procedure 230 is as follows:

$$2Ni(NO_3)_2 + 2Na_2CO_3 + H_2O \rightarrow xNiCO_3 \cdot yNi(OH)_2 \cdot zH_2O + 4NaNO_3 + CO_2 \quad (1)$$

Subsequently, when the reaction procedure 230 is completed after the reaction, the method for forming basic nickel carbonate 200 performs a washing procedure 240 to clean the basic nickel carbonate 316 by a washing module 140. When the washing procedure 240 is completed after the clean, the method for forming basic nickel carbonate 200 performs a filtering procedure 250 to filter the basic nickel carbonate 316 by a filtering module 150.

Figure 3:
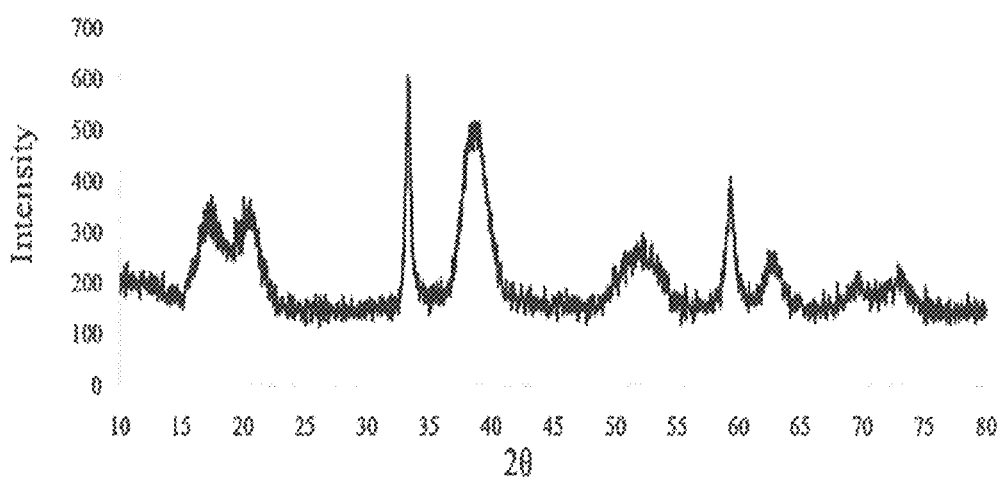
FIG. 3 shows the XRD patterns of the basic nickel carbonate particulates (X-Ray Diffractometer, referred XRD)

After that, when the filtering procedure 250 is completed after the filtration, the method for forming basic nickel carbonate 200 performs a drying procedure 260 at 40~60° C. to dry the basic nickel carbonate 316 and form a basic nickel carbonate particulates 317 by a drying module 160. The particle diameter of the basic nickel carbonate particulates 317 are 20 to 120 μm. Preferably, the particle diameter of the basic nickel carbonate particulates 317 are 60 to 100 μm. FIG. 3 shows the XRD patterns of the basic nickel carbonate particulates 317 (X-Ray Diffractometer, referred XRD), the basic nickel carbonate particulates 317 was confirmed as a synthesized composite from $NiCO_3$ and $Ni(OH)_2$ by XRD patterns.

Figure 4:
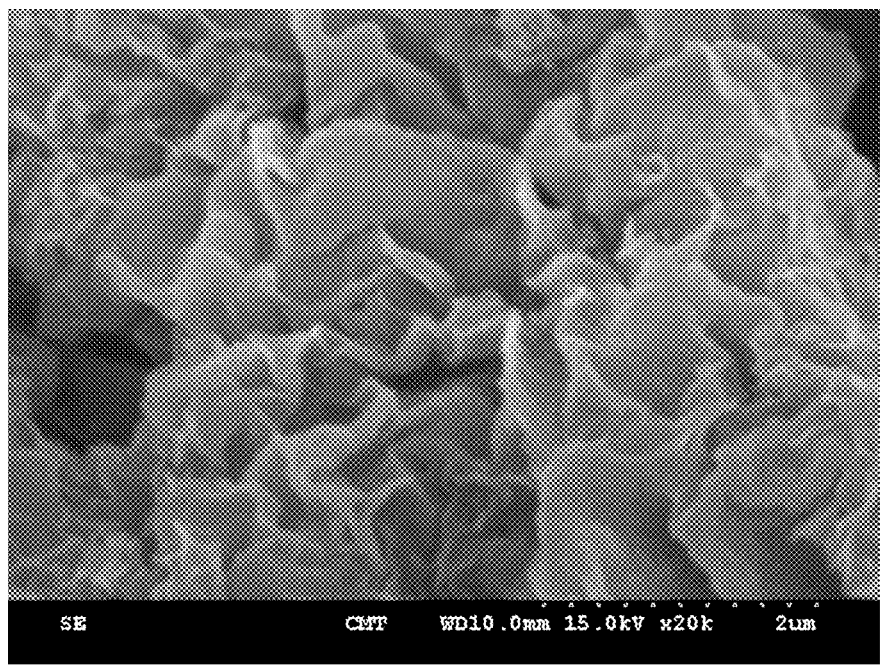
FIG. 4 shows the appearance of the present invention of the basic nickel carbonate particulates by scanning electron microscope (SEM) photograph.
Figure 5:
FIG. 5 shows the overall appearance of the present invention of the basic nickel carbonate particulates.

FIG. 4 shows the appearance of the present invention of the basic nickel carbonate particulates 317 by scanning electron microscope (SEM) photograph. FIG. 5 shows the overall appearance of the present invention of the basic nickel carbonate particulates 317. In addition, Table 1 shows the test data of the basic nickel carbonate particulates 317, the content of the nickel are over 50% (mass %), and the content of the basic nickel carbonate particulates 317 are 51 to 53 percent. The content of the basic nickel carbonate particulates 317 compared with currently available products (44 to 46%) are higher, with a competitive advantage.

TABLE 1

| No. | Ni content (%) | $NO_3^-$ content (%) | $Na^+$ content (%) |
|---|---|---|---|
| 1 | 51.48 | <0.05% | <0.01% |
| 2 | 51.21 | <0.05% | <0.01% |
| 3 | 53.39 | <0.05% | <0.01% |
| 4 | 50.77 | <0.05% | <0.01% |
| 5 | 52.70 | <0.05% | <0.01% |

It is apparent that based on the above descriptions of the embodiments, the present invention can have numerous modifications and alterations, and they should be construed within the scope of the following claims. In addition to the above detailed descriptions, the present invention can be widely applied to other embodiments. The above embodiments are merely preferred embodiments of the present invention, and should not be used to limit the present invention in any way. Equivalent modifications or changes can be made by those with ordinary skill in the art without departing from the scope of the present invention as defined in the following appended claims.

What is claimed is:

1. A method for forming basic nickel carbonate, comprising:

performing a premixing procedure, to blend a first premixing reactant and a second premixing reactant to form a seed solution of basic nickel carbonate, wherein said first premixing reactant further comprises a compound of carbonate, wherein said second premixing reactant further comprises a compound of the nickel element;

performing a feeding procedure, to add said seed solution of basic nickel carbonate once and import a first feeding reactant further comprises a compound of carbonate and a second feeding reactant further comprises a compound of the nickel element into reactants further comprise sodium bicarbonate ($NaHCO_3$); and performing a reaction procedure, to blend said seed solution of basic nickel carbonate, said first feeding reactant and said second feeding reactant to form the basic nickel carbonate, and where a volume percentage of said first premixing reactant, said second premixing reactant, said first feeding reactant, said second feeding reactant and said reactants is about 5:(5~15): (90~100):(90~100): (90~100).

2. A method for forming basic nickel carbonate of claim 1, wherein said compound of carbonate is sodium carbonate ($Na_2CO_3$).

3. A method for forming basic nickel carbonate of claim 1, wherein said compound of the nickel element is nickel nitrate ($Ni(NO_3)_2$).

4. A method for forming basic nickel carbonate of claim 1, wherein the reactant concentration of said first premixing reactant is about 0.5 to 2 M (Mole/ L), wherein said reactant concentration of said second premixing reactant is about 0.5 to 1.5 M (Mole/ L), wherein the reactant concentration of said reactants is about 0.5 to 2 M (Mole/ L), wherein the reactant concentration of said first feeding reactant is about 0.5 to 2 M (Mole/ L), wherein the reactant concentration of said second feeding reactant is about 0.5 to 1.5 M (Mole/ L), wherein the feed rate of said first feeding reactant and said second feeding reactant are 0.4 ~1.2 mL/ min and 0.4 ~1.2 mL/min.

5. A method for forming basic nickel carbonate of claim 1, wherein the volume percentage of said first premixing reactant, said second premixing reactant, said first feeding reactant, said second feeding reactant and said reactants is about 5: 5:95:95:100.

6. A method for forming basic nickel carbonate of claim 1, wherein said reaction procedure is performed 70~90° C. and 7-9 PH value.

7. A method for forming basic nickel carbonate of claim 1, said method further comprising a washing procedure, a filtering procedure and a drying procedure to clean, filter and dry the basic nickel carbonate.

8. A method for forming basic nickel carbonate of claim 1, wherein the reaction equation of said reaction procedure is as follows:

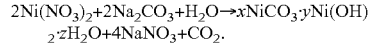

$$2Ni(NO_3)_2 + 2Na_2CO_3 + H_2O \rightarrow xNiCO_3 \cdot yNi(OH)_2 \cdot zH_2O + 4NaNO_3 + CO_2.$$

* * * * *